ns Patent [19]

[11] Patent Number: 4,781,119
[45] Date of Patent: Nov. 1, 1988

Davis

[54] SOLAR-RAPID RAIL MASS TRANSIT SYSTEM

[76] Inventor: James G. Davis, 16246 Rancho Blanco Dr., Houston, Tex. 77083

[21] Appl. No.: 649,183

[22] Filed: Sep. 10, 1984

[51] Int. Cl.⁴ .................. B61B 3/02; B60L 13/00
[52] U.S. Cl. ........................ 104/93; 104/94; 104/288; 105/35; 105/50; 105/150; 105/155; 180/2.2
[58] Field of Search .............. 104/89, 91, 93, 94, 104/287, 288; 105/26 R, 49, 50, 148, 150, 155; 180/2.2

[56] References Cited

U.S. PATENT DOCUMENTS

| | | | |
|---|---|---|---|
| 1,506,613 | 8/1924 | Camp | 104/94 X |
| 2,825,291 | 3/1958 | Chadenson | 104/94 |
| 3,059,591 | 10/1962 | Chadenson | 105/155 |
| 3,198,140 | 8/1965 | Chadenson | 105/150 |
| 3,774,542 | 11/1973 | Walsh | 104/89 |
| 3,834,316 | 9/1974 | Hennings | 104/94 X |
| 3,861,315 | 1/1975 | Rypinski | 104/94 X |
| 3,971,454 | 7/1976 | Waterbury | 180/2.2 X |
| 4,090,577 | 5/1978 | Moore | 105/50 X |
| 4,171,670 | 10/1979 | Roberts | 104/93 |
| 4,181,188 | 1/1980 | Dessert | 180/2.2 |
| 4,218,889 | 8/1980 | Buell | 180/2.2 X |

Primary Examiner—Robert B. Reeves
Assistant Examiner—David F. Hubbuch

[57] ABSTRACT

A solar-powered rapid transit system is provided, which travels suspended above ground along a horizontal rail, supported by vertical/horizontal supports. The guide rail is basically a parallelogram, with five inner surfaces. It can be configured as either an overhead monorail system, or a birail system. The rail car is attached to and suspended from such rail by power transmission and support shafts, each of which attaches to a wheel box that fits into the horizontal guide rail. Power is transmitted to the wheels in each wheel box from several electric motors by a series of pulleys and belts in a unique configuration. Such wheels then propel the rail car or cars, which can be connected in series, down the rail. Power for electric motors is supplied by rectangular solar panels supported by vertical supports attached to the roof of each rail car, which extend several feet above the rail car and guide rails. Hinges allow the solar panels to pivot in the direction of the sun, to receive optimum sunlight for power generation. Storage batteries mounted atop each rail car would store generated solar power for night operation and periods when optimal sunlight is unavailable. An electronic sensor rod extending from each wheel box to a groove in the inner surface of the rail picks up system control signals and auxiliary power supplied by a municipal power utility from such groove.

5 Claims, 9 Drawing Sheets 4,781,119

SOLAR-RAPID RAIL MASS TRANSIT SYSTEM

FIELD OF THE INVENTION

This invention is basically an overhead monorail, or birail rapid transit system, powered by a self-contained solar energy power supply system, connected to such guide rail(s) by a power-transmission and wheel box configuration.

PRIOR ART

Other rail systems have been suggested to solve the transportation problems facing many urban areas, but they usually suggest highly technical rail configurations and means of propulsion, many of which would be too costly to install in sprawling metropolitan areas, and have not been proven to be viable modes of mass transit. The cost of building heavy rail systems and subways, presently in use in some cities, has become astronomical.

SUMMARY OF THE INVENTION

This invention solves many of the problems plaguing other systems, such as high costs of construction, by providing a simple design in its rail car power transmission system, based on simple, proven technology. Another cost saver is the savings in cost of operation due to its self-contained solar power generation/storage system. One objection to prior systems is the high and unpredictable cost of electric power to run the system. Since the solarail system would generate and supply its own power, this expense would be eliminated. Another problem and expense to be eliminated by this system is the cost of acquiring rights-of-way for track beds, and constructing expensive, time consuming subway tunnels. Since the system is to be suspended several feet above ground, existing interstate and freeway rights-of-way can be used, as such system could be suspended above freeways and roads. The system could also be constructed over freeway buslanes and transitways, and other previously constructed mass-transit corridors, thus facilitating quick, easy, inexpensive construction and more efficient use of available facilities.

One embodiment of the solarapid transit system has the rail car attached to a vertical multi-sided rectangular monorail by two power-transmission and support shafts, each of which connects to a wheel box. Each wheel box contains eight wheels, which power the rail car along the guide rail. The horizontal guide rail is supported above the surface of the ground or highway by a vertical/horizontal support structure, which consists of an inverted L-shaped beam constructed of high-strength metal alloy. The horizontal portion of the beam is the inverted leg of the L (⌐) which extends outward from the vertical portion of the beam. Such horizontal portion attaches to the horizontal guide rail at a perpendicular angle. The L-beam supports would be spaced along the rail at regular intervals to provide adequate support. The horizontal rail is actually a twelve-sided rectangle with a slot in which the wheel box travels, consisting of seven outer surfaces, and the five inner surfaces of the wheel box slot. The pneumatic tire wheels of the wheel box run along the upper and lower inner surfaces of such slot. Within the wheel box slot, an inner groove runs among its vertical inner surface. This groove carries the auxiliary-municipal power line and electronic computer control circuits. It is attached to the wheel box by a horizontal electronic sensor rod. The wheel box slot is designed in such a manner that it protects the inner surfaces and wheel box from severe weather ice, snow, and rain elements (Drain slots would be spaced along the lower surface of the horizontal guide rail at regular intervals to permit drainage of rain water), and thus facilitate continued operation of the solarapid transit in inclement or severe weather.

Two solar panels are positioned above the rail car and rail by four vertical poles, which are hinged at the point that they are attached to the panels. This allows them to pivot in the changing direction of the sun, providing maximum power generation capabilities. The vertical poles are hollow, providing a conduit to transmit power produced by the photovoltaic solar panels to the storage batteries and electric motors positioned on the roof of the rail car. Solar panel operation and pivot control wires connecting to the pivot motors on the back of the solar panels at the top of the vertical poles would also run through such vertical poles.

A small area at each end of the inside of each rail car would have a small control room, for manual motorman operation, or a computer monitoring system control panel and on-board computer for automatic computer-controlled systems.

Another embodiment of the solarapid transit invention is the birail mode. This mode repeats the above described structure, moving it from the points where it attaches in the middle of the roof of the rail car to one side, and positioning two more motor-power-transmission-wheel box and solar panel assemblies on the opposite side of the rail car roof. This mode constitutes a means to provide greater support for the rail car, and greater power generation capabilities.

Another embodiment is the electromagnetic coupling factor of each rail car, allowing them to be connected in series to form a train of sufficient length to provide adequate passenger seating for various load capacity requirements. A few rail cars can be connected for off-peak periods, and several rail cars can be connected in peak rush-hour periods, to accomodate increased passenger loads. To provide car-to-car access for passengers, transit authority personnel, and transit security officers while a rapid-transit train is in motion, manual or motorized sliding doors would be positioned at each end of the rail car. A covered walkway made of fiberglass or highgrade plastic material constructed in an accordion-type configuration would also be attached at each end of the car on the outside, and extend out and over the sliding end-doors. The accordion-type design of such walkways allows them to be extended outward from the rail car, and attached to another walkway extending from the next rail car, providing a safe walkway with protection from the elements. When the rail cars are uncoupled, the walkways can be retracted and folded up against the end walls.

Another embodiment of the transit system is the design and configuration of the electric motor-power transmission and support shaft-wheel box assembly. There are two alternative design conceptions of such assembly. One allows all eight wheels in each wheel box to be powered by two electric motors, a ratio of four wheels per motor. The other conception provides four motors to power the eight wheels, a ratio of two wheels per motor. In both conceptions, a series of pulleys and belts in a specific configuration connect the electric motors to power axles in the transmission/support shaft and wheel box, which distribute power to the drive wheels. The outer walls of the power shaft are made of high strength steel or other metal or alloy material, designed in a vertical/horizontal L-shape (similar to the rail support beam described above), to provide support for the rail car, and connect it to the rail itself.

DESCRIPTION OF THE PREFERRED EMBODIMENTS

Figure 1:
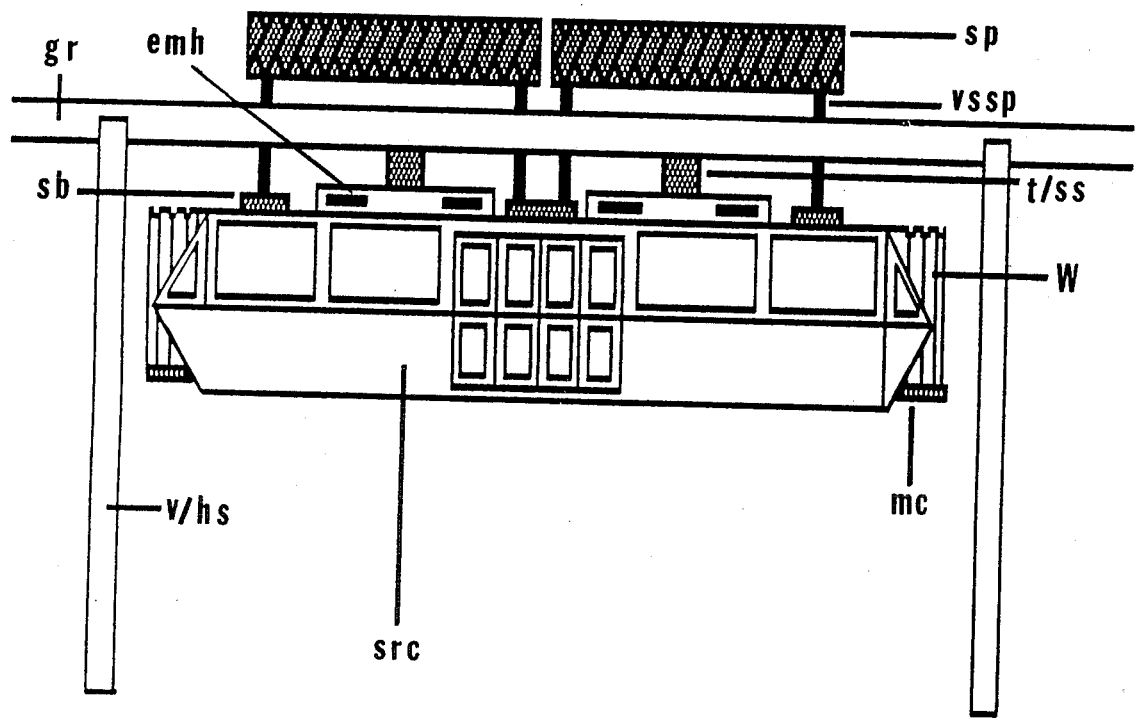
FIG. 1 shows a side view of the preferred embodiment of a solarapid transit rail car in monorail mode, with various features described herein pointed out.

FIG. 1 shows a side view of the embodiment of the monorail mode. The solarail car src is suspended from the guide rail gr (this view is of the outer side of the guide rail, opposite the wheel box slot) by the power transmission/support shaft t/ss. The guide rail is supported by the vertical/horizontal support v/hs. The solar panels sp, extend above the rail car by vertical solar support poles vssp. Also depicted are the electric motor housing emh, power storage battery housing sb, magnetic coupler mc, and retractible walkway w.

Figure 2:
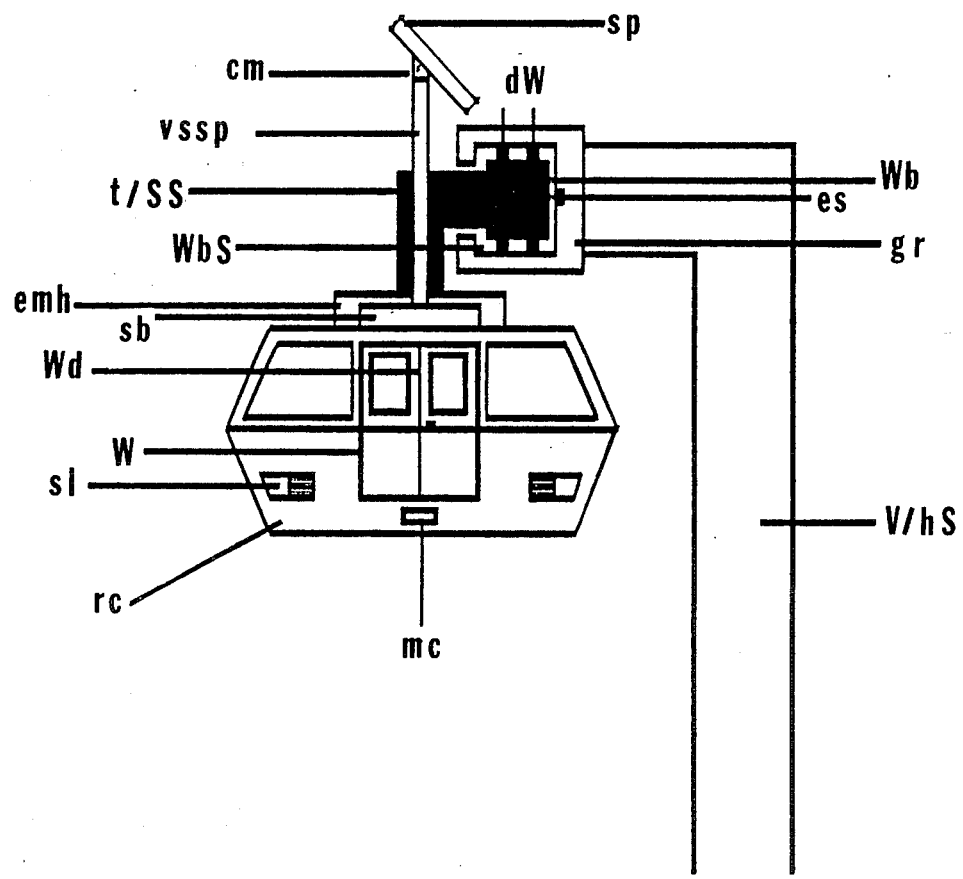
FIG. 2 is an end view of a rail car preferred embodiment in monorail mode, illustrating the electric motor housing, vertical pole and storage bettery, with canted solar panel extended above the car. This drawing also depicts the power transmission/support shaft and wheel box, and how this assembly fits into the end of the horizontal rail, and the vertical/horizontal L-beam rail support. Also shown is the sliding end door, outline of the accordiontype walkway, and electromagnetic coupler, and solar canting mechanism.
Figure 3:
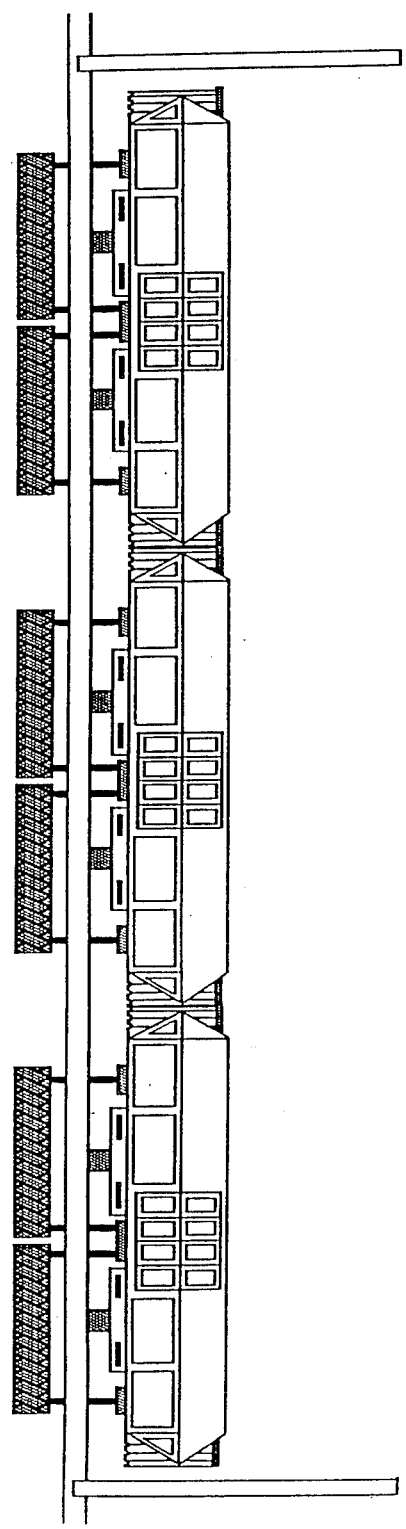
FIG. 3 illustrates a side view of three solarail cars connected in the preferred embodiment of a train.

FIG. 2 illustrates the preferred embodiment in an end view of a rail car rc, showing how the wheel box wb fits into the wheel box slot wbs. The drive wheels dw contact the upper and lower inner surfaces of the guide rail gr. Power from the electric motor, located in the electric motor housing emh is transmitted to the drive wheels dw, through the power-transmission/support shaft t/ss. This unit of the drive system extends vertically from the top of the electric motor housing emh to a point opposite and parallel to the wheel box slot wbs. The wheel box slot is the open area within the guide rail gr. The guide rail is suspended by the vertical/horizontal support beam v/hs. A horizontal segment then extends into the open wheel box slot, and attaches to the wheel box. The power drive-transmission system operates within the walls of the powertransmission/support shaft t/ss. The rotation of the drive wheels (depicted in FIG. 8) propels the rail car along the guide rail gr. This design configuration requires a high strength, lightweight metal alloy construction. The photovoltaic solar panels sp, which would provide electric power to the electric motors, are shown in a canted position extended above the rail car and guide rail by the vertical solar support poles vssp, which attach to the storage battery housing sb. This illustration reveals the canted angle, which allows maximum sunlight reception. Also depicted in FIG. 2 are the sliding walkway doors wd, outline of the walkway w, signal lights s1, one red, one clear headlight on each side. The signal lights will be positioned at each end of the rail car, to further facillitate back and forth movement of each rail car throughout the system, without the need for a turntable. The magnetic coupler mc, which will utilize electromagnetic force to couple a series of rail cars in sequence to form a train (illustrated in FIG. 3), is also shown. Various operational and rail traffic control signals along with alternate power are supplied to the rail car thtough the electronic sensor es. The solar canting mechanism, cm, is also shown.

Figure 4:
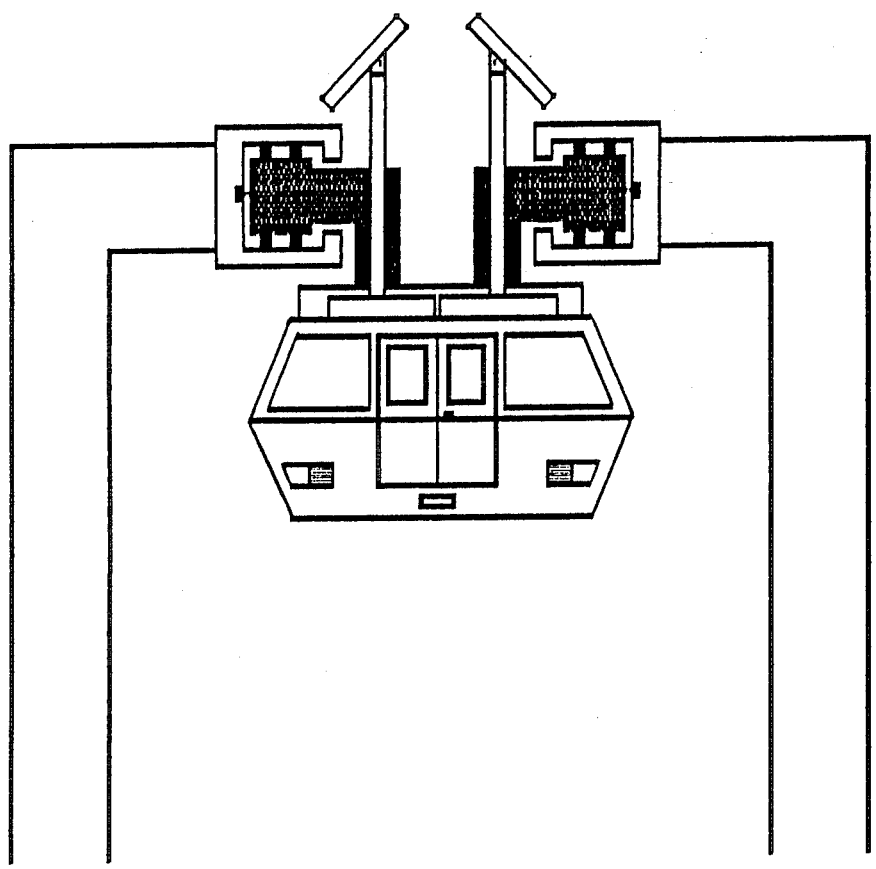
FIG. 4 illustrates the solarapid rail car in an end view of the preferred embodiment of the birail mode.
Figure 5:
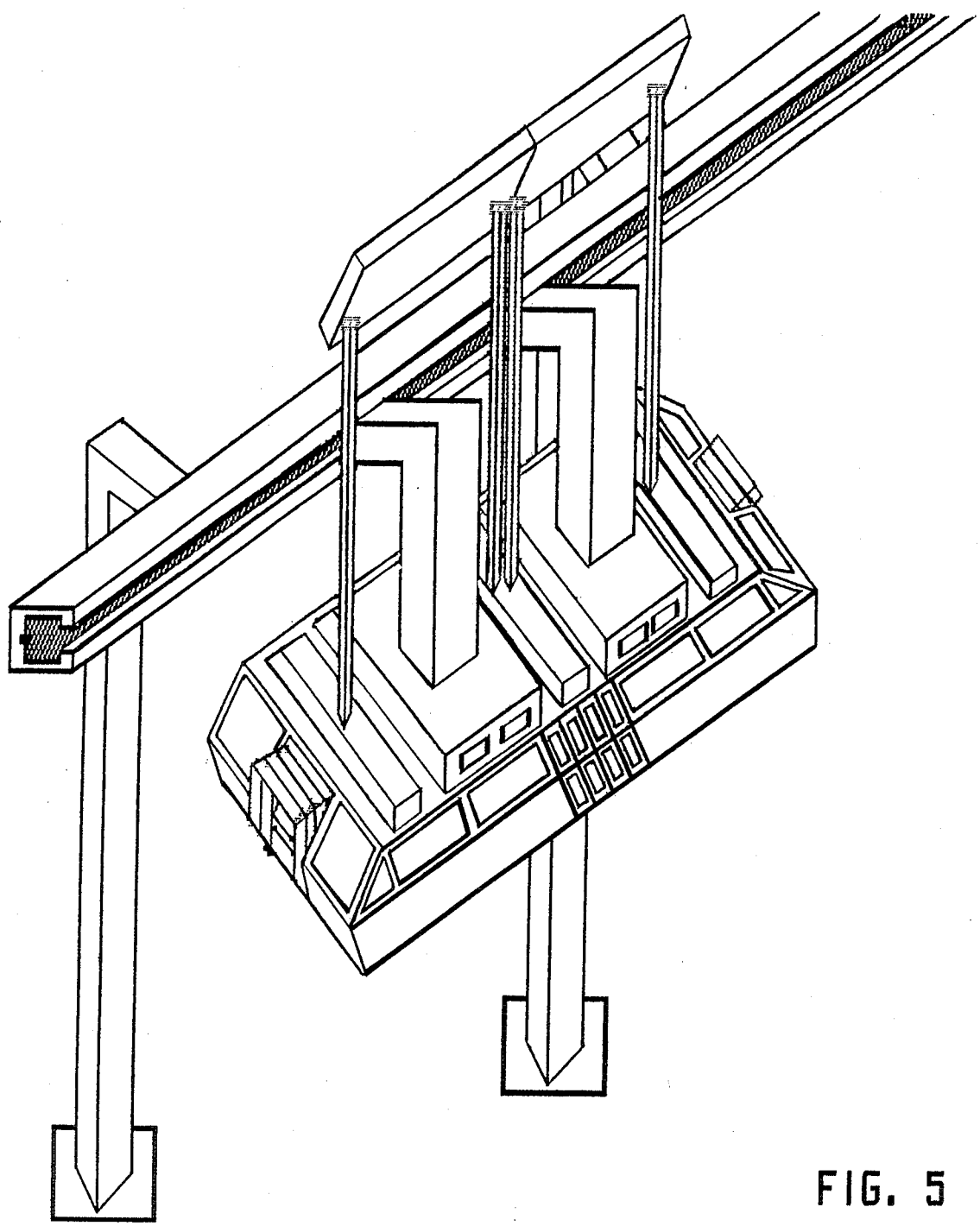
FIG. 5 is an orthographic projection of the preferred embodiment of a solarapid rail car in monorail mode, depicting the horizontal rail and vertical/horizontal rail support system, along with the electric motor and storage battery housings. This figure also depicts the extensions of the power transmission/support shaft and wheel boxes, and solar panels above the rail car.

For increased rail support, solar power generation, and electric motor drive power, the solar power generation, power-transmission/support system, guide rail and vertical/horizontal support structures shown in FIG. 2 are doubled in the embodiment of the birail mode, as illustrated in FIG. 4. These elements are three dimensionally depicted in FIG. 5, an orthographic projection of a rail car in the monorail mode.

Figure 6:
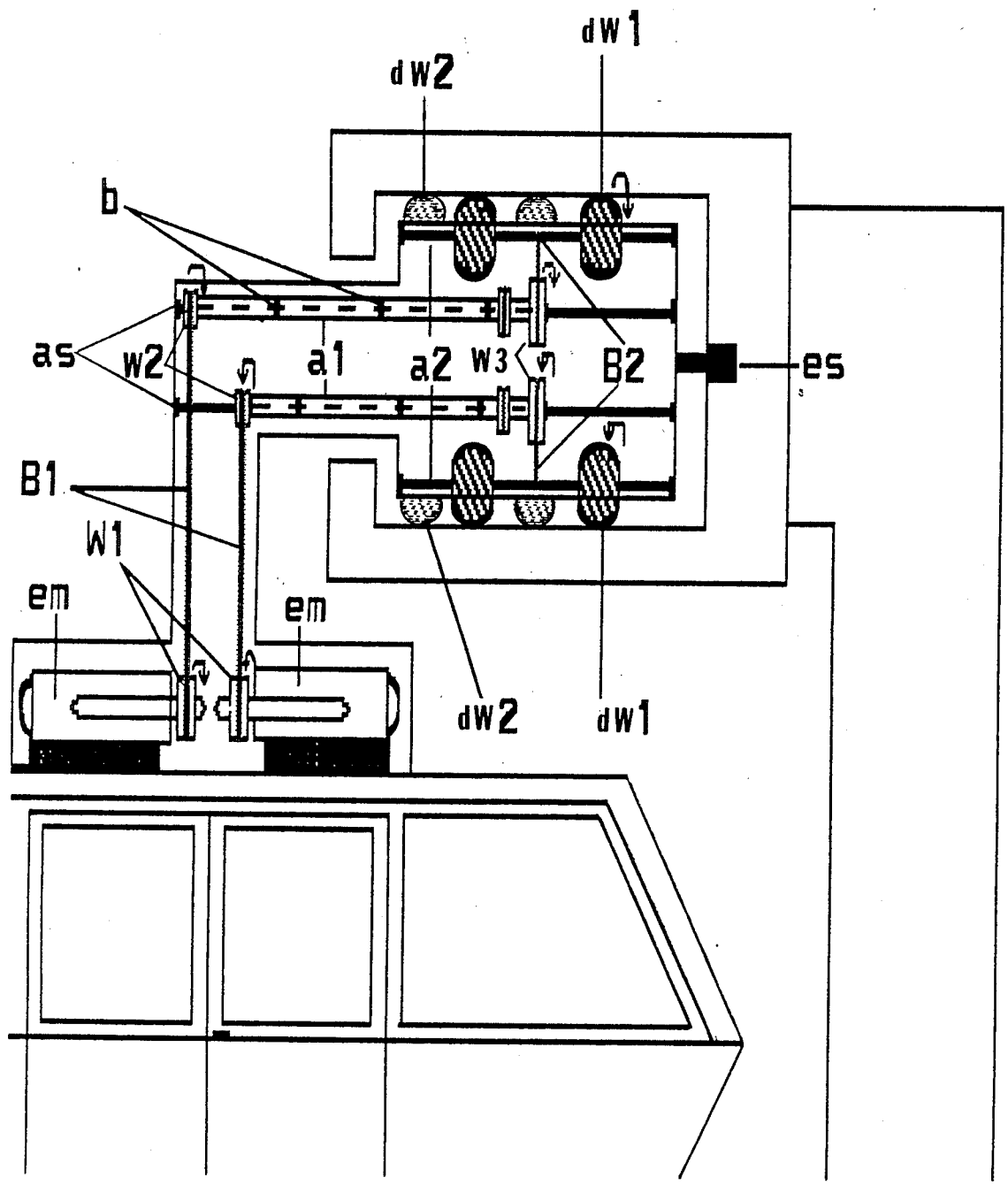
FIG. 6 is a description of the preferred embodiment of the inside of the electric motor housing, power-transmission/support shaft and wheel box as it fits inside the wheel box slot of the rail assembly. This is an illustration of the configuration of the pulley-belt-axle-wheel power transmission-drive system.

FIG. 6 is a cut-away end view of the preferred embodiment of the power-transmission/support system and wheel box system. This illustration reveals the pulley-belt-wheel configuration. Originating in the electric motor em, power generated within such motor turns pulley wheel 1 (W1). The arrows depict the direction that each pulley wheel is turning in the power-transmission system. The rotation of W1 pulls belt 1 (B1), which in turn rotates W2. The W2 pulley wheels rotate axles a1, which rotate on axle support as, balanced by bearings b. The axles extend through the horizontal portion of the transmission/ support shaft into the wheel box, where it rotates the W3 pulley wheels. These W3 pulley wheels rotate belts B2, which in turn rotate the axles a2, which in turn power the drive wheels dw1. The W4 wheels transfer power to the opposite end of the wheel box, to drive wheels dw2 (These wheels are slightly offset in the drawing). This illustration shows one power assembly, for the monorail mode, with two electric motors. Also depicted in electronic sensor es.

Figure 7:
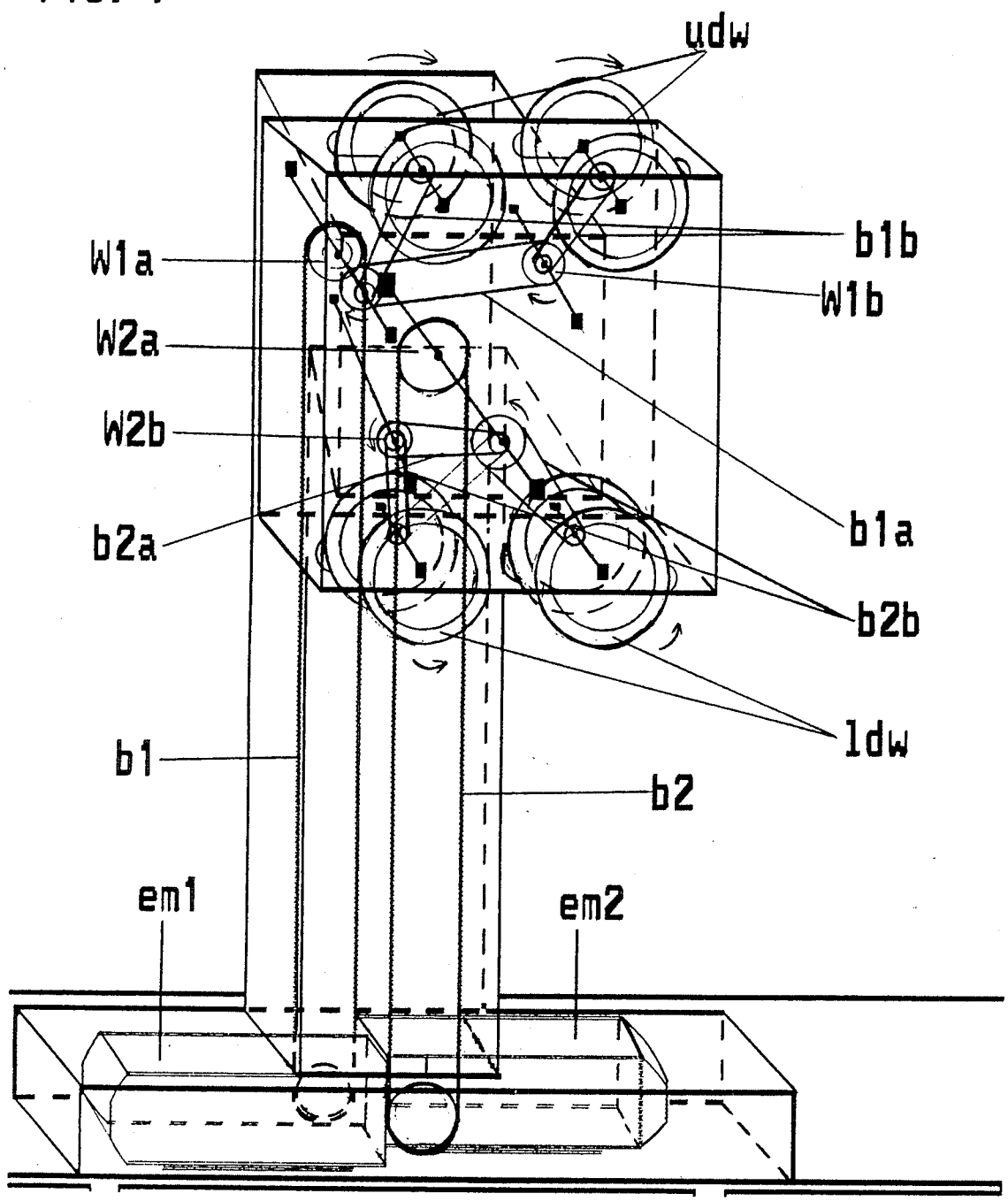
FIG. 7 This drawing is a side view of the preferred embodiment of the inside of the power-transmission assembly. In this configuration, two electric motors are used to drive the eight wheels. The upper surface wheels are slightly offset to illustrate how the pulley-belt system transfers and distributes power to the drive wheels.
Figure 8:
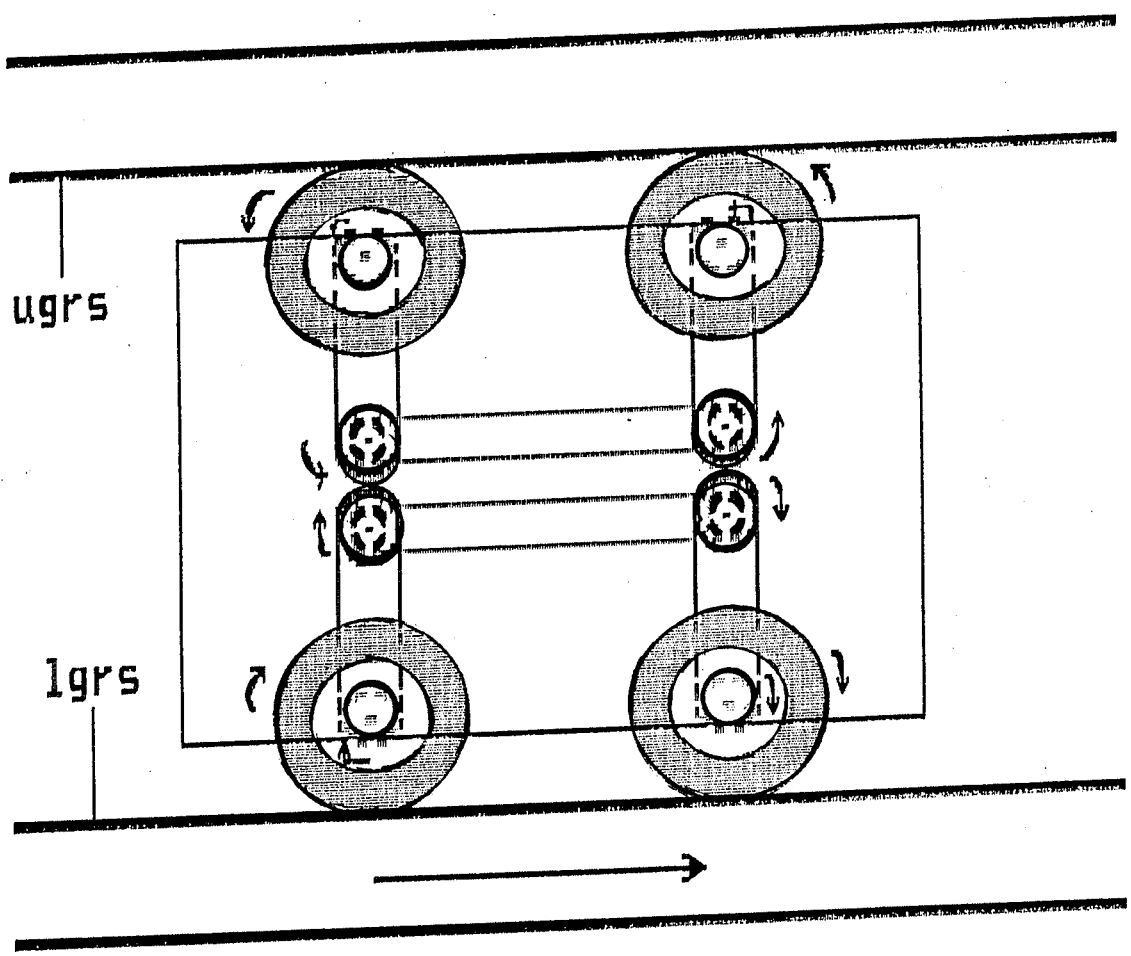
FIG. 8 is a description of the side view of the preferred embodiment of the wheel box as it would operate within the rail slot, in a two motor drive configuration.
Figure 9:
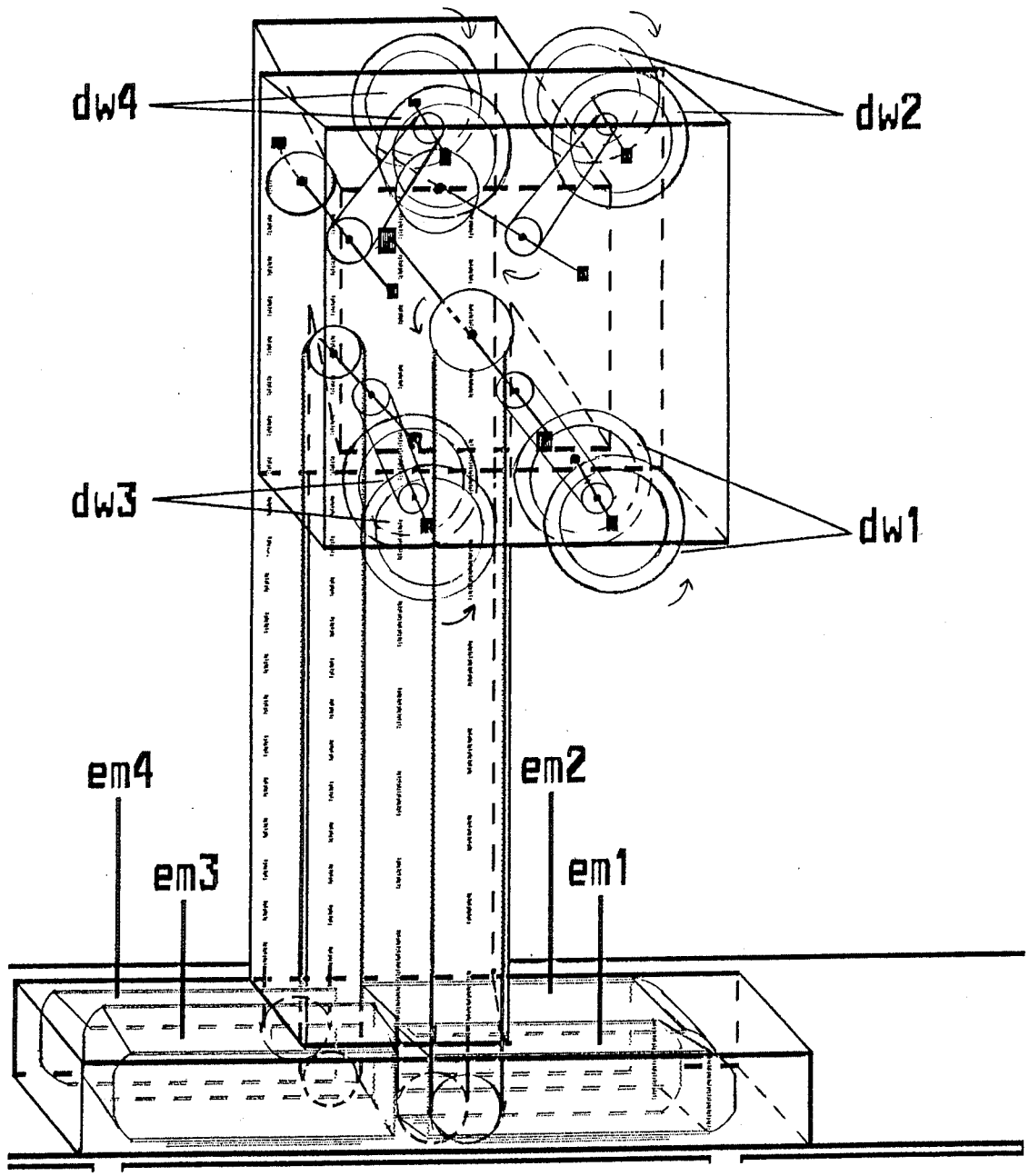
FIG. 9 is a side view of the preferred embodiment of the power-transmission system in the four motor drive configuration, illustrating the pulley-belt drive power distribution system.

FIG. 7 is a side view of this assembly with two electric motors powering all eight wheels. A close-up view of the pulley wheel and belt interaction is illustrated in FIG. 8. FIG. 9 illustrates a side cut-away view of the preferred embodiment of the power-transmission system, using four electric motors. In this configuration, there is one motor for every two wheels, providing increased power.

In FIG. 7, electric motors em1 and em2 drive pulley wheels W1 and W2, which in turn pull belts b1 and b2. These belts attach to wheels W1a and W2a, which in turn pull belts b1a and b2a. Wheels W1b and W2b rotate belts b1b and b2b. These belts turn the axles, which are connected to their respective drive wheels. The b1b axles rotate the upper drive wheels udw (These wheels are slightly offset in the drawing to facilitate their illustration). The b2b axles rotate the lower drive wheels 1dw. FIG. 8 is a close-up of this function. showing how the upper and lower drive wheels rotate in opposite directions. This rotation powers the wheel box along the upper and lower guide rail inner surfaces, ugrs and lgrs. In FIG. 9, there are four electric motors. Referencing the description of the pulley-belt drive system shown in FIG. 7, em1 drives the series of pulleys and belts connected to lower drive wheels dw1. em2 powers upper drive wheels dw2. em3 powers the series leading to lower drive wheels dw3, and em4 powers upper drive wheels dw4.

Summarizing the Preferred Embodiments, this invention is basically an overhead rail transit system, powered by solar energy that can be built in one of four modes:

(a) A monorail system connected to the overhead guide rail by two powertransmission/support systems, connecting to two wheel boxes, which are inserted into the inner surfaces of such guide rail, called the wheel box slot. The wheel boxes contain the drive wheels, which power the rail car along the guide rail. The power source in this configuration is two electric motors for each power transmission unit, or, four such motors per rail car. This embodiment would have two overhead photovoltaic solar panels.

(b) The embodiment described in (a) above, except this embodiment has four electric motors per power unit, or eight such motors per rail car.

(c) A birail system with four power-transmission-wheel box units, two on each side of the top of the rail car, with two electric motors, and four photovoltaic solar panels per rail car.

(d) The birail system described in (c) above, with four electric motors per unit, sixteen total motors, and four solar panels per rail car.

The design of the guide rails and guide rail supports allow such systems to be constructed over freeways, busways, other transitways, streets, etc. Therefore, this system would be economical, as no additional rights-of-way would have to be acquired. Since no rail beds or subway tunnels would have to be constructed, as in conventional rail systems, building this system would not only be more economical, but less time consuming. It could therefore be constructed cheaper, easier, and faster than conventional systems. The configuration of the wheel box slot within the guide rail protects its inner surfaces from ice, snow, rain, etc., and would therefore allow continued trouble-free operation in inclement weather conditions.

What is claimed is:

1. A solar-powered mass transportation rail system, comprising at least one overhead rail extending above the ground defining a wheel box slot therein;
   at least two solar-powered rail cars suspended from said rail, each car having a plurality of hollow support poles extending from the top of the car,
   photovoltaic solar panels supported by said support poles,
   motorized, remote controlled canting means for allowing the solar panels to be tilted consistently toward the position of the sun,
   each car having a self-contained solar power generation system including at least two electric motors, storage batteries for providing power when access to sunlight is less than optimal, the motors and batteries being located on the top of each car, the support poles providing a conduit for power generated in the solar panels to be transmitted to the batteries and in turn to the motors,
   at least one power transmission wheel box system at each each of each car providing both propulsion and support of the car, each wheel box system fitting into said wheel box slot,
   the rail cars providing seating for 25-50 passengers, retractable side doors for passenger loading and unloading at transit stops, end doors with collapsible, accordian-type fiberglass walkways to allow passengers to pass car to car while the train is in motion, and
   the cars being connected by electromagnetic couplers.

2. The mass transportation system of claim 1, including two said overhead rails, the wheel box slots of the two rails facing one another, allowing a dual, overhead support system for the cars.

3. The mass transportation system of claim 1, wherein each wheel box system includes at least one pneumatic drive wheel, and power is transmitted from the electric motors to the drive wheels by a series of pulleys, belts and axles.

4. The mass transportation system of claim 1, wherein each said overhead rail is a twelve-sided rectangle in cross-section consisting of seven outer surfaces and five inner surfaces, the five inner surfaces defining the wheel box slot, the rail being supported at intervals by inverted L-shaped beams which extend up from the ground.

5. The mass transportation system of claim 4, wherein an inner groove runs along a vertical inner surface of the rail, the groove carrying auxiliary power and control systems, each wheel box system having an electronic sensor connecting to said groove to pick up said auxiliary power and control signals.

* * * * *